Jan. 6, 1970  D. A. SAWERS  3,488,001
GARDEN OR FIELD WATERING DEVICES
Filed Oct. 19, 1967
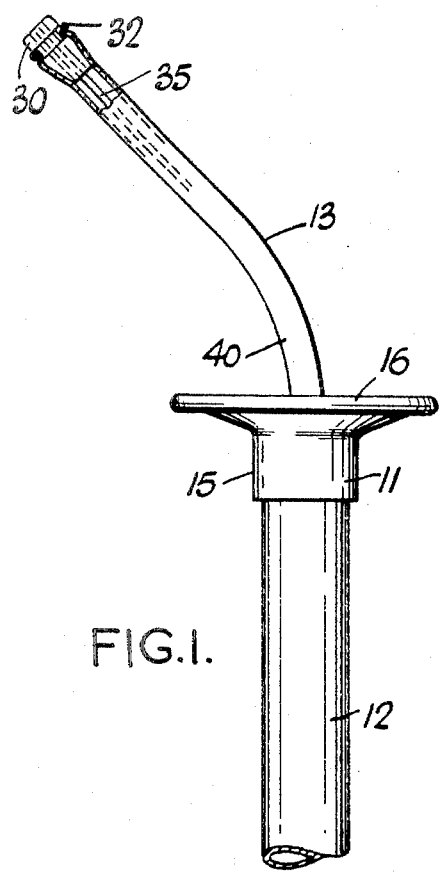
FIG.1.
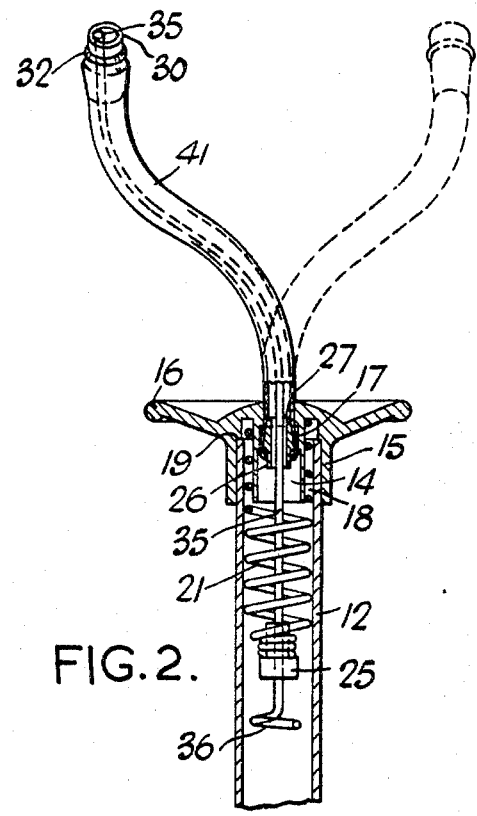
FIG.2.
FIG.3.
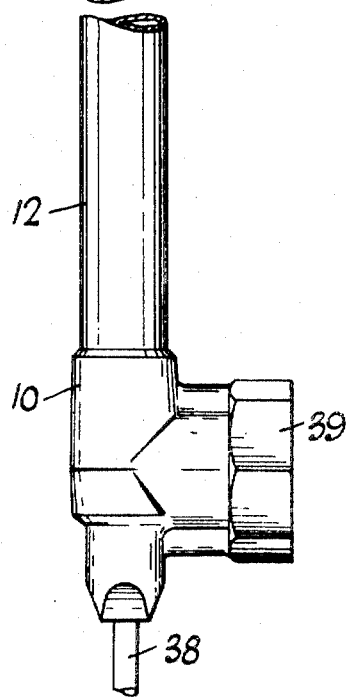
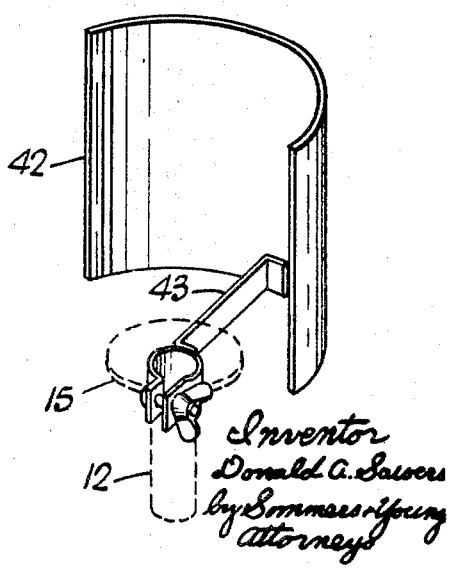
Inventor
Donald A. Sawers
by Sommers & Young
Attorneys ём
United States Patent Office 3,488,001
Patented Jan. 6, 1970

3,488,001
GARDEN OR FIELD WATERING DEVICES
Donald Alexander Sawers, 15 Tintern Ave.,
Toorak, Victoria, Australia
Filed Oct. 19, 1967, Ser. No. 676,424
Claims priority, application Australia, Oct. 20, 1966,
12,871/66
Int. Cl. B05b 3/00
U.S. Cl. 239—229            6 Claims

ABSTRACT OF THE DISCLOSURE

A watering device having a spray head and a flexible tube which is non-rotatably secured at one end to the spray head and has a nozzle at the other end. A rigid restraining member in the tube extends from the nozzle into the spray head and is shaped to locate the nozzle offset from the axis of the fixed end of the tube. The restraining member is supported for rotation about an axis which is substantially coaxial with the fixed end of the discharge tube.

---

This invention relates to garden or field watering devices and more particularly to such devices which employ a rotational action.

In garden or field watering devices of a rotating nature, it is customary to provide journals and bearings to permit part thereof to freely rotate in order to disperse water in all directions. It is also necessary in current rotating watering devices to provide glands or seals for the purpose of preventing leakage of water. It is inherent in such designs that they are relatively costly to manufacture and furthermore that, consequent upon operational use, component parts in contact wear and ultimately permit leakage and have to be repaired or replaced. It is also inherent in many smaller rotational watering device designs incorporating journals, bearings and seals, that the small amount of friction imposed allows excessively rapid rotation with reduction in spray coverage.

It is the principal object of the present invention to provide a watering device of a construction whereby manufacturing costs are reduced and which provides inherently greater reliability in so far as wear and leakage is concerned. It is also desirable for the construction to incorporate built-in friction characteristics which enables a more compact device to spray water a large distance because excessive rotational speeds can be controlled.

With the above stated principal object in view, there is provided according to the invention a watering device for gardens or fields comprising a spray head connectable to a water source, a flexible discharge tube non-rotatably secured, at one end to the spray head, said tube being arranged to receive water from the spray head at said one end and discharge the water from a nozzle at the other outlet end, a rigid restraining member extending from within the nozzle through the bore of the tube into the spray head, said member being nozzle shaped to locate the offset from the axis of the fixed end of the tube, and means to support said restraining member for rotation about an axis substantially coaxial with the fixed end of the discharge tube whereby the efflux of water from the nozzle causes the restraining member to rotate and move said nozzle in a circular path about said axis.

Conveniently, the restraining member is a stiff rod or wire, having a straight portion within the spray head supported in journals, and extending into the discharge tube through a retaining bush in the end of the discharge tube. The retaining bush co-operates with a bore in the spray head in a wedging action to grip the wall of the end portion of the tube therebetween and thus non rotatably secures the discharge tube to the spray head. This manner of securing the tube to the spray head provides a simple and effective seal. The bore of the retaining bush is sufficiently large to permit water to freely pass therethrough around the rod. In spite of the clearance between the rod and the retaining bush, the latter acts as one journal to rotatably support the rod.

The turning moment applied to the nozzle at the end of the discharge tube by the efflux of water therefrom is transmitted to the restraining member to cause it to rotate about the axis of the straight portion thereof. The rotating restraining member carries the nozzle in a circular path and the tube is free to move on the restraining member to prevent twisting of the tube.

The invention will be more readily understood from the following description of one practical arrangement of the watering device as illustrated in the accompanying drawings.

In the drawings:

FIGURE 1 is a side elevation of the watering device.

FIGURE 2 is a sectional end elevation view of the spray head of the device shown in FIGURE 1; and FIGURE 3 is a perspective view of a deflector which may be fitted to the watering device.

Referring now to the drawings, the watering device comprises a base 10 to which a water supply hose may be connected, the spray head 11 being from the base 10 by the rigid tube 12, and the flexible discharge tube 13 extending from the spray head 11.

The spray head 11 is moulded from a substantially rigid plastic and has a generally cylindrical boss 15 with a slightly dished peripheral flange 16 adjacent the upper end. The boss 15 has a coaxial bore 14 extending therethrough, with an intermediate stepped portion 17, the smallest diameter end being uppermost. A separate annular cavity 18, coaxial with the bore, extends inwardly from the lower end of the boss 15. The upper end of the rigid support tube 12 is received in the cavity 18 and is adhered to the spray head 11. The tube 12 abuts against the radial shoulder 19 in the cavity 18.

The upper end of the helical spring 21 is received in the cavity 18 and has at least two closely wound end coils of larger diameter than the adjacent coils which frictionally engage the radially inner surface of the cavity. The closely wound coils are located above the shoulder 19 and of a diameter greater than the internal diameter of the support tube 12. This interference retains the spring in assembly with the spray head. The spring 21 is also a close fit in the support tube 12 so that the spring is retained coaxial with the bore 14 of the spray head. The lower end of the spring 21 has several coils of reduced diameter which receive and support a bearing bush 25 of plastic, brass or other suitable non-rusting, wear resistant material.

The flexible discharge tube 13 is non-rotatably attached to the spray head by the boss retainer bush 26 fitted into the end of the tube 13. The retainer bush has a plain coaxial bore 27 and a tapered external surface. The tapered surfaces of the bush 26 and bore portion 17 co-operate in a wedging action to grip the wall of the discharge tube therebetween. Fitted into the free end of the discharge tube 13 is a nozzle 30 having a peripheral groove in which the discharge tube is gripped by the ring 32.

Extending through and rotatably supported by the bearing bush 25, retainer bush 26 is a stiff restraining rod or wire 35, which also extends into the flexible discharge tube 13 and terminates at the upper end in the nozzle 30. The restraining rod 35 has substantial clearance in the bores of the retainer bush 26, discharge tube 13 and nozzle 30 so that water can flow freely therethrough. The lower end 36 of the rod 35 is provided with a head or deformed, so as to prevent upward movement of the rod through the bearing bush 25 without restricting the flow of water. The portion of the restraining rod 35 between the retainer core 26 and nozzle 30 is of a curved configuration which will be referred to in further detail later in this specification. The downward movement of the rod through the retainer bush 26 is restricted, as the curved shape thereof would require lateral movement of the bush 25 to permit such downward movement, and the close fit of the spring 21 in the support tube 12 will not permit such lateral movement.

In an alternative construction, the separate nozzle 30 is not used, but the efflux end of the flexible discharge tube is reduced in diameter, by heat forming, in order to give additional velocity to efflux water passing out through it. The outer end of the restraining rod 35 is smoothly rounded so as not to cut the flexible discharge tube. However, in variations of the design, it is envisaged that the restraining rod may pass out through the nozzle, and that it may carry or be formed into a spray deflecting device.

The configuration of the restraining rod above the spray head 11 plays an important part in the functioning of the watering device. The rod between the bearing bush 25 and retainer bush 26 is straight and substantially coaxial with the spray head and support tube 12. Immediately after passing up through the spray head 11, the rod 35 is first curved outwardly at 40 with respect to the spray head axis, but still coplanar with the straight portion. The rod is then curved at 41 so as to project outwardly from said plane of the first curve. This configuration results in the nozzle 30 being displaced laterally from the axis of the straight portion of the rod 35 and upwardly inclined.

Thus under the reaction force applied to the discharge tube 13 by water efflux from the nozzle 30, a turning moment is applied to both the tube and the rod contained therewithin, tending to rotate the nozzle about the axis of the straight portion of the rod. This straight portion of the rod is free to rotate in the bush 25 and retaining bush 26 but the discharge tube 13 cannot rotate bodily in respect to the spray head 11, because one end of the tube is firmly attached to the spray head by the retainer core 26.

Thus as the rod and nozzle 30 rotate, as a result of the turning moment produced by the efflux of water, the tube is free to move on the rod so that the tube does not become twisted about the rod.

The velocity of angular rotation of the rod about the spray head is limited by the amount of friction imposed between the flexible tube and the rod, and this can be varied by varying the radius, and number of bends in the rod 35, and/or the direction and location of the nozzle relative to the axis of rotation of the rod. Rapidity of angular motion can therefore be controlled by this built-in friction, and hence the radius of water disposed can be optimised. The rod 35 is of a stiffness sufficient to retain during operation the shape imparted thereto during manufacture or after subsequent adjustment.

The above described construction results in a watering device in which the discharge nozzle prescribes a regular circular path without the necessity of providing glands or other forms of seals between the relatively rotating component. The device is thus comparatively cheap to manufacture and reliable in service. The relative movement between the flexible tube and restraining rod provides a self-clearing action to render the sprinkler less susceptible to clogging.

The jet of water issuing from the efflux end of the flexible tube and rod assembly can be broken up into droplets in a number of ways, either by the peripheral and radial velocity of the water at the outlet end of the discharge tube, the nature or shape of the nozzle 30 or by deflecting means mounted on the end of the rod 35 before or after it passes through the nozzle. It is visualised that the rod itself may either be bent or shaped so that it appropriately interfers with the efflux water stream to shape its discharge, or that a spring or other member could be mounted on the end of the rod 35 so as to periodically interfere with it and provide long distance and short distance sprays in periodic fashion. It is also obvious that the discharge angle and position of the nozzle can be varied so as to optimise spray results.

The base 10 and the spray head 11 are adhered to a support tube 12 and a metal spike 38 extends co-axially downwards from the base so that it can be pushed into the ground to support the watering device. The base has an internally threaded boss 39 projecting laterally therefrom capable of being screwed into the end of a garden watering hose to provide a water supply to the device.

FIGURE 3 of the drawings shows a shroud or baffle 42 adjustably mounted by the bracket 43 to the spray head 11. The shroud intercepts the efflux water jet during a portion of the circular path of the nozzle. The shroud may comprise two or more relatively movable sections to permit adjustment to the amount of the path of the water that is intercepted.

The shroud prevents the discharge of water on an area where it is not wanted: the water instead being deflected to a more suitable location. For instance, the shroud makes possible the positioning in the device at the corner of a house to allow watering of gardens or lawns adjacent to its walls without wetting the walls themselves or windows contained in them.

In the device above described, the end of the discharge tube secured to the spray head is non-rotatable, has variations in dimensions of the bore 14 and the retaining bush 26 may permit limited or free rotation of the tube, a satisfactory water seal being achieved by cooperation of tube and retaining bush with the bore 14.

I claim:

1. A watering device for gardens or fields comprising a spray head connectable to a water source, a flexible discharge tube non-rotatably secured at one end to the spray head, said tube being arranged to receive water from the spray head at said one end and discharge the water from a nozzle at the other outlet end, a rigid restraining member extending from within the nozzle through the bore of the tube into the spray head, said member being shaped to locate the nozzle offset from the axis of the fixed end of the tube, and means to support said restraining member for rotation about an axis substantially coaxial with the fixed end of the discharge tube whereby the efflux of water from the nozzle causes the restraining member to rotate and move said nozzle in a circular path about said axis.

2. A watering device as claimed in claim 1, wherein the discharge tube extends from a bore in the spray head and said one end of the tube is secured coaxially in said bore, and the restraining member extends through said bore into the tube, said restraining member having a substantially straight portion within the spray head supported by the support means.

3. A watering device as claimed in claim 1, wherein the restraining member has a straight portion within the spray head, and the support means comprise two spaced bearings supported by the spray head and rotatably supports said straight portion coaxially with the fixed end of the discharge tube.

4. A watering device as claimed in claim 1, wherein the support means comprises a bearing bush mounted coaxially in one end of an open coiled helical spring, said spring being attached at the other end to the spray head to locate the bearing coaxial with a bore in the spray head, and a retaining bush fitted in the fixed end of the discharge tube and securing said end in said bore, the restraining member having a straight portion rotatably supported in the bearing bush and retaining bush.

5. A watering device for gardens or fields comprising a base connectable to a water source, a spray head, a support tube mounted on the base and supporting the spray head, said support tube providing a passage to conduct water from the base to the spray head, a bore in the spray head communicating with said passage, a flexible discharge tube non-rotatably secured at one end in said bore by a retaining bush and in sealed water conducting communication therewith, a nozzle at the other end of the discharge tube, a rigid rod extending from the nozzle through the discharge tube and bore into the support tube, an open coiled spring attached at one end to the spray head and extending into the support tube, and a bearing mounted in the other end of the spring coaxial with the bore in the spray head, said rod having a substantially straight portion rotatably supported by the bearing and retaining bush and extending therefrom into the one end of the discharge tube, the portion of the rod within the discharge tube between the spray head and the nozzle being of curved configuration so as to locate the nozzle in an offset relation with respect to the axis of the straight portion of the rod whereby the efflux of water from the nozzle causes the rod to rotate and move the nozzle in a circular path about said axis of the straight portion.

6. A device as claimed in claim 5, wherein the curved portion of the rod comprises a first curved section directed upwardly and outwardly with respect to the axis of the straight portion and coplanar therewith, and a second curved section directed upwardly and outwardly with respect to said plane of the first curved section.

References Cited

UNITED STATES PATENTS 2,381,213   8/1945   Forman _____ 239—229
2,752,195   6/1956   Whitehead _____ 239—229 X E. W. KIRBY, Primary Examiner